(12) United States Patent
Niumeitolu

(10) Patent No.: US 9,840,122 B2
(45) Date of Patent: Dec. 12, 2017

(54) ELECTRIC GENERATOR FOR ATTACHMENT TO A SHOCK ABSORBER

(71) Applicant: Vilo Niumeitolu, South Australia (AU)

(72) Inventor: Vilo Niumeitolu, South Australia (AU)

( * ) Notice: Subject to any disclaimer, the term of this patent is extended or adjusted under 35 U.S.C. 154(b) by 59 days.

(21) Appl. No.: 14/787,500

(22) PCT Filed: May 19, 2014

(86) PCT No.: PCT/AU2014/050044
§ 371 (c)(1),
(2) Date: Oct. 28, 2015

(87) PCT Pub. No.: WO2014/186839
PCT Pub. Date: Nov. 27, 2014

(65) Prior Publication Data
US 2016/0059657 A1    Mar. 3, 2016

(30) Foreign Application Priority Data
May 20, 2013 (AU) .................................. 2013901787

(51) Int. Cl.
*H02K 7/18* (2006.01)
*B60G 13/14* (2006.01)
*F16F 9/00* (2006.01)

(52) U.S. Cl.
CPC .............. *B60G 13/14* (2013.01); *F16F 9/00* (2013.01); *H02K 7/1823* (2013.01); *B60G 2300/60* (2013.01)

(58) Field of Classification Search
CPC ....... B60G 13/14; B60G 2300/60; F16F 9/00; H02K 7/1823
See application file for complete search history.

(56) References Cited

U.S. PATENT DOCUMENTS 2,042,499 A * 6/1936 Brady ...................... F04D 5/00
                                                                  415/106
2,283,844 A * 5/1942 Brady, Jr. ............... F04D 5/002
                                                                  415/55.1
(Continued)

*Primary Examiner* — Tulsidas C Patel
*Assistant Examiner* — S. Mikailoff
(74) *Attorney, Agent, or Firm* — Defillo & Associates, Inc.; Evelyn A. Defillo

(57) ABSTRACT

A shock absorber comprising a generally tubular body defining a working chamber. A piston is slidable in the working chamber and separates a compression chamber from a rebound chamber of the working chamber. The working chamber contains damping fluid. The shock absorber comprises an electric generator fitted thereto. The generator comprises a turbine rotatably coupled to at least one magnet and coils adjacent the magnet. The shock absorber comprising a turbine flow path between the compression chamber and the rebound chamber, the turbine being supported for rotation in the turbine flow path driven to rotate by flow of damping fluid. Preferably the turbine flow path comprises a compression flow path and a rebound flow path and a turbine chamber, the compression flow path providing for flow of damping fluid from the compression chamber though the turbine chamber to the rebound chamber. One way valves are positioned in the compression and rebound flow paths so that flow only occurs in a respective flow path during compression and rebound of the piston. Movement of said damping fluid though either of said compression flow path or said rebound flow path causes the turbine to rotate in only one rotary direction to thereby generate an electric current in said at least one coil.

5 Claims, 13 Drawing Sheets

(56) References Cited

U.S. PATENT DOCUMENTS

| | | | | |
|---|---|---|---|---|
| 3,140,855 A * | 7/1964 | Williams | ............... | F02C 1/02 204/196.36 |
| 3,507,580 A | 4/1970 | Landon | | |
| 5,118,961 A * | 6/1992 | Gamell | ............... | F01D 1/34 290/52 |
| 5,265,997 A * | 11/1993 | Tuckey | ............... | F02M 37/048 415/55.1 |
| 5,327,987 A * | 7/1994 | Abdelmalek | ............... | B60K 6/48 180/65.25 |
| 5,337,560 A * | 8/1994 | Abdelmalek | ............... | B60G 13/14 180/65.25 |
| 6,113,363 A * | 9/2000 | Talaski | ............... | F02M 37/048 415/55.1 |
| 6,152,687 A * | 11/2000 | Wilhelm | ............... | F04D 5/002 415/55.1 |
| 6,299,406 B1 * | 10/2001 | Yu | ............... | F04D 29/188 415/55.1 |
| 6,533,538 B2 * | 3/2003 | Aslam | ............... | F04D 29/188 415/55.2 |
| 6,767,179 B2 * | 7/2004 | Kusagaya | ............... | F02M 37/048 415/55.1 |
| 6,920,951 B2 | 7/2005 | Song et al. | | |
| 6,932,562 B2 * | 8/2005 | Ross | ............... | F04D 5/005 415/55.1 |
| 7,416,381 B2 * | 8/2008 | Baek | ............... | F04D 29/188 415/52.1 |
| 8,063,498 B2 * | 11/2011 | Namuduri | ............... | B60G 13/14 290/1 R |
| 8,376,100 B2 | 2/2013 | Avadhany et al. | | |
| 8,541,895 B2 * | 9/2013 | Kuriki | ............... | B60G 13/06 290/1 R |
| 8,614,518 B2 * | 12/2013 | Li | ............... | B60G 17/019 290/1 R |
| 8,624,409 B2 * | 1/2014 | Sainio | ............... | B60G 13/02 290/1 R |
| 9,150,076 B2 * | 10/2015 | Coombs | ............... | B60G 17/08 |
| 9,249,806 B2 * | 2/2016 | Talaski | ............... | F04D 5/005 |
| 9,481,221 B2 * | 11/2016 | Reybrouck | ............... | B60G 15/08 |
| 2006/0228207 A1 * | 10/2006 | Baek | ............... | F04D 29/188 415/55.1 |
| 2007/0089919 A1 | 4/2007 | de la Torre et al. | | |
| 2008/0290624 A1 | 11/2008 | Yamanaka et al. | | |
| 2010/0219641 A1 * | 9/2010 | Namuduri | ............... | B60G 13/14 290/54 |
| 2010/0263973 A1 * | 10/2010 | Hall | ............... | F16F 9/187 188/313 |
| 2011/0084503 A1 * | 4/2011 | Li | ............... | B60G 17/019 290/1 R |
| 2011/0266801 A1 | 11/2011 | Sainio | | |
| 2012/0001399 A1 * | 1/2012 | Coombs | ............... | B60G 17/08 280/124.161 |
| 2012/0193919 A1 * | 8/2012 | Kuriki | ............... | B60G 13/06 290/52 |
| 2014/0190156 A1 * | 7/2014 | Reybrouck | ............... | B60G 15/08 60/431 |
| 2014/0203530 A1 * | 7/2014 | Coombs | ............... | B60G 17/08 280/124.16 |
| 2016/0025179 A1 * | 1/2016 | Coombs | ............... | B60G 17/08 188/315 |
| 2016/0121683 A1 * | 5/2016 | Park | ............... | B60G 13/18 188/266.2 |

* cited by examiner

# ELECTRIC GENERATOR FOR ATTACHMENT TO A SHOCK ABSORBER

CROSS REFERENCE TO RELATED APPLICATION

This application is a national stage entry of PCT/AU2014/050044 filed May 19, 2014, under the International Convention claiming priority over Australian Patent Application No. 2013901787 filed May 20, 2013.

FIELD OF THE INVENTION

The present invention relates to the field of generating an electric current from a vehicular shock absorber.

BACKGROUND OF THE INVENTION

The suspension system of a land vehicle typically includes multiple shock absorbers that are connected between the sprung mass of the vehicle and unsprung mass of the vehicle. Shock absorbers absorb unwanted vibrations that occur during movement of the suspension system.

Generally shock absorbers for vehicles such as automobiles are hydraulic shock absorbers that comprise a tubular body having a piston that divides the interior of the body into an upper working chamber and a lower working chamber. The tubular body is attached to the vehicle wheel assembly (unsprung mass) and the outwardly extending end of a piston rod is connected to the body of the vehicle (sprung mass).

Such shock absorbers are generally either of a twin tube or mono tube design. The monotube shock absorber comprises a single pressure tube. The piston has compression valving which limits the flow of damping fluid from the lower working chamber to the upper working chamber during a compression stroke and rebound valving which limits the flow of damping fluid from the upper working chamber to the lower working chamber during a rebound stroke. The compression and rebound valving of the piston produce the damping force which counteracts the vibration which would otherwise be transmitted from the unsprung mass to the sprung mass.

The twin tube shock absorber has a reserve tube located around the pressure tube to form a reservoir there between. In typical twin tube shock absorbers a base valve assembly is positioned between the lower working chamber and the fluid reservoir to control the flow of damping fluid. The compression valving and the rebound valving is located in the base valve assembly. The piston of the shock absorber reciprocates inside the working chamber of the tubular body as the vehicle moves. The piston comprises apertures that allows restricted fluid flow between the upper and lower working chambers. Negative and positive pressure within the lower working chamber forces damping fluid respectively through the rebound valving or the compression valving out of and into the fluid reservoir.

It is an object of the present invention to harness energy from damping fluid flows of the compression stroke and rebound stroke.

It is another object of a specific aspect of this invention to harness energy in a shock absorber from pressure differences between the upper working chamber and the lower working chamber using a turbine to convert the same to electrical energy.

There have been several attempts to convert energy from suspension systems of vehicles to electrical energy. U.S. Pat. No. 3,507,580 takes off the pressure of the damping fluid of the shock absorber to feed to a remote pressure driven motor coupled with a remote electricity generator. U.S. Pat. No. 6,920,951, U.S. Pat. No. 8,541,895 and US patent publication 20080290624 utilise in line reciprocal movement of the piston rod relative to a stator to generate electricity, and US Patent publication 20070089919 utilises a remote reciprocal electricity generator coupled with the piston to generate electricity. U.S. Pat. No. 8,376,100 discloses a further suggestion that takes off the pressure of the damping fluid of the shock absorber to feed a remote pressure driven electricity generator. The hydraulic motor of this prior publication has a number of limitations, requiring several one-way valves and conduits to route the flow of fluid and a fluid reservoir to dampen the suspension system and inhibit freewheeling of the hydraulic motor. The use of several one-way valves increases the chance for failure, while the multiple conduits and fluid reservoir makes the system difficult to fit in a simple manner to existing shock absorber configurations.

It is desirable to have a generator that is compact and can be fitted to a shock absorber tube without the need for a remote generator.

It should be appreciated that any discussion of the prior art throughout the specification is included solely for the purpose of providing a context for the present invention and should in no way be considered as an admission that such prior art was widely known or formed part of the common general knowledge in the field as it existed before the priority date of the application.

SUMMARY OF THE INVENTION

In a broad aspect, the invention provides a shock absorber comprising a generally tubular body defining therein a working chamber and having a piston slidable therein, the piston separating a compression chamber from a rebound chamber of the working chamber within said tubular body, the working chamber containing damping fluid, the shock absorber comprising an electric generator fitted thereto, said generator comprising a turbine rotatably coupled to at least one magnet, said generator further comprising at least one coil spaced apart, and adjacent to, said at least one magnet, the shock absorber further comprising a turbine flow path between the compression chamber and the rebound chamber, the turbine supported for rotation in the turbine flow path urged by flow of damping fluid.

The turbine flow path preferably comprises a compression flow path and a rebound flow path and a turbine chamber, the compression flow path providing for flow of damping fluid from the compression chamber though the turbine chamber to the rebound chamber, and further comprising a compression flow path one way valve to allow for the flow therethrough only on the compression stroke, the rebound flow path providing for flow of damping fluid from the rebound chamber though the turbine chamber to the compression chamber, and having a rebound flow path one way valve to allow for the flow therethrough only on the rebound stroke.

Preferably movement of said damping fluid though either of said compression flow path or said rebound flow path causes the turbine to rotate in only one rotary direction to thereby generate an electric current in said at least one coil.

The compression flow path and the rebound flow path are arranged so that a respective fluid flow onto the turbine is axially from opposite directions, said turbine having a plurality of circumferentially arranged vanes each vane having a compression face for rotation by fluid flowing through the compression flow path and a rebound face for rotation by fluid flowing though the rebound flow path, fluid from a respective flow path onto said rebound face and compression face urges the turbine to rotate in the same direction.

In one form the vanes each comprise a compression face that is angled inwardly of the duct towards the mid region the compression face being presented for contact with a flow of damping fluid from the compression flow path, and a rebound face that is angled inwardly of the duct towards the mid region being presented for contact with a flow of damping fluid from the rebound flow path.

Alternatively the turbine might be provided with separate compression vanes and rebound vanes having respective faces for rotation by flow either through the compression flow path or the rebound flow path.

Having the turbine rotate in only one rotary direction means that energy need not be expended to reverse the direction of the turbine.

Preferably the compression flow path comprises a flow restricting valve.

In one form the flow restricting valve comprises a plurality of abutting annular members coaxially aligned within the compression flow path and urged together by a biasing means, whereby an increase in the fluid pressure during said compression stroke urges the annular members to separate against the influence of said biasing means to thereby increase the flow of fluid through said flow restricting valve The electric generator is preferably a direct current generator and comprises a plurality of fixed coils and a plurality of permanent magnets carried by the magnet holder. The rotation of the turbine results in the movement of said magnets, such that an electric current is produced in the plurality of coils by way of induction.

In one form the turbine includes a plurality of permanent magnets exposed at an upper surface of the rotor.

In another form a magnet holder is fixed to the turbine, said magnet holder carrying the plurality of magnets. The turbine and magnet holder together may be regarded as a turbine assembly and may be separately formed and fixed together or may be integrally formed. The turbine and magnet holder may be disassemblable or may be permanently fixed together. It will be understood that the magnets are held by either the turbine or the magnet holder to induce an electric current in a plurality of coils held within a coil housing that is spaced apart therefrom.

The shock absorber preferably comprises a generator housing comprising the generator, the generator housing being fitted into the upper end of the shock absorber. In the case of a mono tube shock absorber the generator housing is preferably fitted to the upper end of the tubular body and extends thereinto. In the case of a twin tube shock absorber preferably an upper end of the reserve tube extends above the working tube and the generator housing is fitted into the upper end of the reserve tube.

In one form the generator housing is screw threaded as is the upper end of the reserve tube or the working tube, such that the generator housing is screwed into the upper end of the relevant tube.

In one form a lower end of the generator housing comprises a turbine, or turbine assembly, cavity, the turbine, or turbine assembly is supported for rotation within the cavity, the turbine, or turbine assembly, being annular having a central aperture a base extending beneath the turbine to support the turbine from underneath and further comprising an upright wall extending upwardly into the central aperture to support the turbine for rotation therein.

In one form turbine and magnet holder comprise an internal extending annular gap extending internally therebetween from the central aperture of the turbine assembly, said base extending into said internal extending annular gap to encase the turbine from above. In this embodiment the base thus forms a shell for the turbine. Preferably in this form the base comprises a base aperture to allow for ingress and outflow of damping fluid during the compression and rebound strokes of the piston.

In one form a bearing insert is provided between the upright wall of the base and the central aperture of the turbine. Thus where the turbine is made of metal the bearing may comprise a low friction property metal such as bronze. In an alternate form a surface of the upright wall of the base adjacent the central aperture of turbine acts as a bearing against the adjacent surface of the turbine. This alternate form may be preferred where the turbine is of a suitable plastics material such as with low friction, relatively hard and temperature resilient properties. Thus the turbine may be made for example of nylon, and no metal bearing insert is required.

In one form the plurality of vanes are surrounded by a peripheral ring so that the turbine comprises a plurality of ducts formed between the vanes.

In one form each of the vanes may comprise planar wall portions of one of a plurality of ducts extending from one side of the turbine to the other.

Preferably each of the plurality of ducts includes a respective first side that increases the flow resistance of said damper fluid relative to an opposing second side of the duct.

In one form each duct of the turbine includes a first side being tapered from a mid region of the duct towards opposite ends of the duct, and an opposing second side of the duct being generally parallel with the axis of rotation of the turbine.

The first side may include a first planar wall portion that is angled inwardly of the duct towards the mid region wherein the first portion is presented for contact with a flow of damper fluid originating from said first end of the duct, and a second planar wall that is angled inwardly of the duct towards the mid region wherein it is presented for contact with a flow of damping fluid originating from said second end of the duct.

The first and second wall portions of the first side of the duct may meet at the mid region or adjoin opposing edges of a middle wall portion that is generally parallel to the second side of the duct. The cross sectional shape of the first side of the duct may be a truncated pyramidal shape. The first and second wall portions may be curved inwardly or include scoops to increase the flow resistance thereby causing the turbine to rotate in a single direction whether the flow of damping fluid originates from the first or second end of the respective duct.

The resistance to flow of the damping fluid is therefore less adjacent the second side of the duct in comparison to the first tapered side of the duct, due to the restriction of the first side of the duct. This therefore induces rotational movement of the turbine in a single direction.

In another form the first side of the duct may be curved or otherwise shaped to increase the flow resistance adjacent said first side. The ducts are preferably formed by walls that extend between the first and second surfaces of the turbine.

However vanes or slats may be used in the place of walls to form the ducts or passageways that direct the flow of fluid through the turbine.

In another aspect of the invention there is proposed a electric generator for attachment to a shock absorber, including an annular turbine and magnet holder rotatably held within an annular base, at least one magnet connected to the turbine for rotation therewith and at least one coil positioned so as to generate an electric current on rotation of said at least one magnet, the turbine comprising a plurality of vanes and the base having compression and rebound openings, the compression opening permitting a damping fluid of said shock absorber to pass therethrough on a compression stoke of the shock absorber and to act on at least one of said plurality of vanes thereby causing the turbine to rotate in a one direction, and the rebound opening permitting said damping fluid to pass therethrough on a rebound stroke after said fluid has acted on the at least one of said plurality of vanes, thereby causing the turbine to rotate in said one direction.

The annular base is preferably configured to slide over a piston rod of the shock absorber and be attached to the cylindrical body of the shock absorber, such that it does not inhibit movement of the piston rod. A bearing may be positioned between the base and the turbine to permit rotation of the turbine relative to the base.

The magnets may be integral with the magnet holder or may be attached thereto.

The electric generator may be screwed into the top of the cylindrical body, or a rod guide thereof, or in another form may be part of a rod guide.

The turbine is preferably rotatable around an upright axis of rotation, wherein the turbine includes a first upper surface and a second underside surface. The ducts may extend through the turbine from the first upper surface to the second underside surface, wherein the ducts are generally parallel to the axis of rotation of the turbine and are spaced apart from each other around the annular turbine.

In one form of the invention flow of the damper fluid during the compression stoke, as the fluid comes into contact with the turbine, is from below and in a generally vertical direction. Whist the flow of the damper fluid during the rebound stoke, as the fluid comes into contact with the turbine, is from above and in a generally horizontal direction. During the compression stoke, as the fluid exists the ducts of the turbine, the flow changes to a generally horizontal path and then downwardly in a generally vertical direction such that the fluid enters the rebound chamber. In contrast during the rebound stroke, the flow of the damping fluid changes to a generally vertical downward path when the fluid enters the ducts of the turbine, which continues in through the second opening.

BRIEF DESCRIPTION OF THE DRAWINGS

The accompanying drawings, which are incorporated in and constitute a part of this specification, illustrate implementations of the invention and, together with the description, serve to explain the advantages and principles of the invention. In the drawings.

DETAILED DESCRIPTION OF THE ILLUSTRATED AND EXEMPLIFIED EMBODIMENTS

Figure 1A:
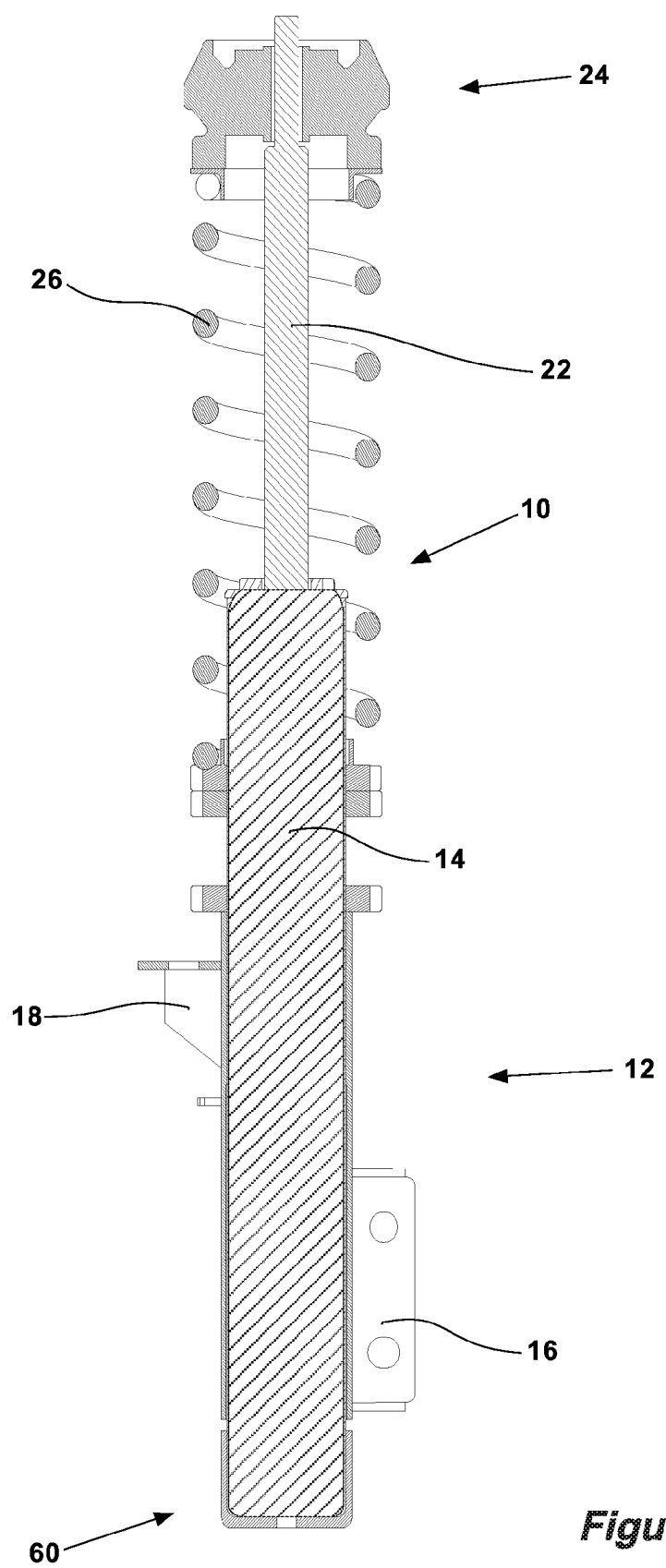
FIG. 1a is a partial cross sectional view through a shock absorber comprising an electric generator of the present invention contained within a cylindrical body.

There are numerous specific details set forth in the following description. However, from the disclosure, it will be apparent to those skilled in the art that modifications and/or substitutions may be made without departing from the scope and spirit of the invention. In some circumstance specific details may have been omitted or enlarged so as not to obscure the invention. Similar reference characters indicate corresponding parts throughout the drawings.

Turning to the figures for a detailed explanation of the invention, there is illustrated an electric generator 10 demonstrating, by way of an example, an arrangement in which the principles of the present invention may be employed. The reader should appreciate that the electric generator of the present invention can be used on shock absorbers of different configurations.

Figure 1B:
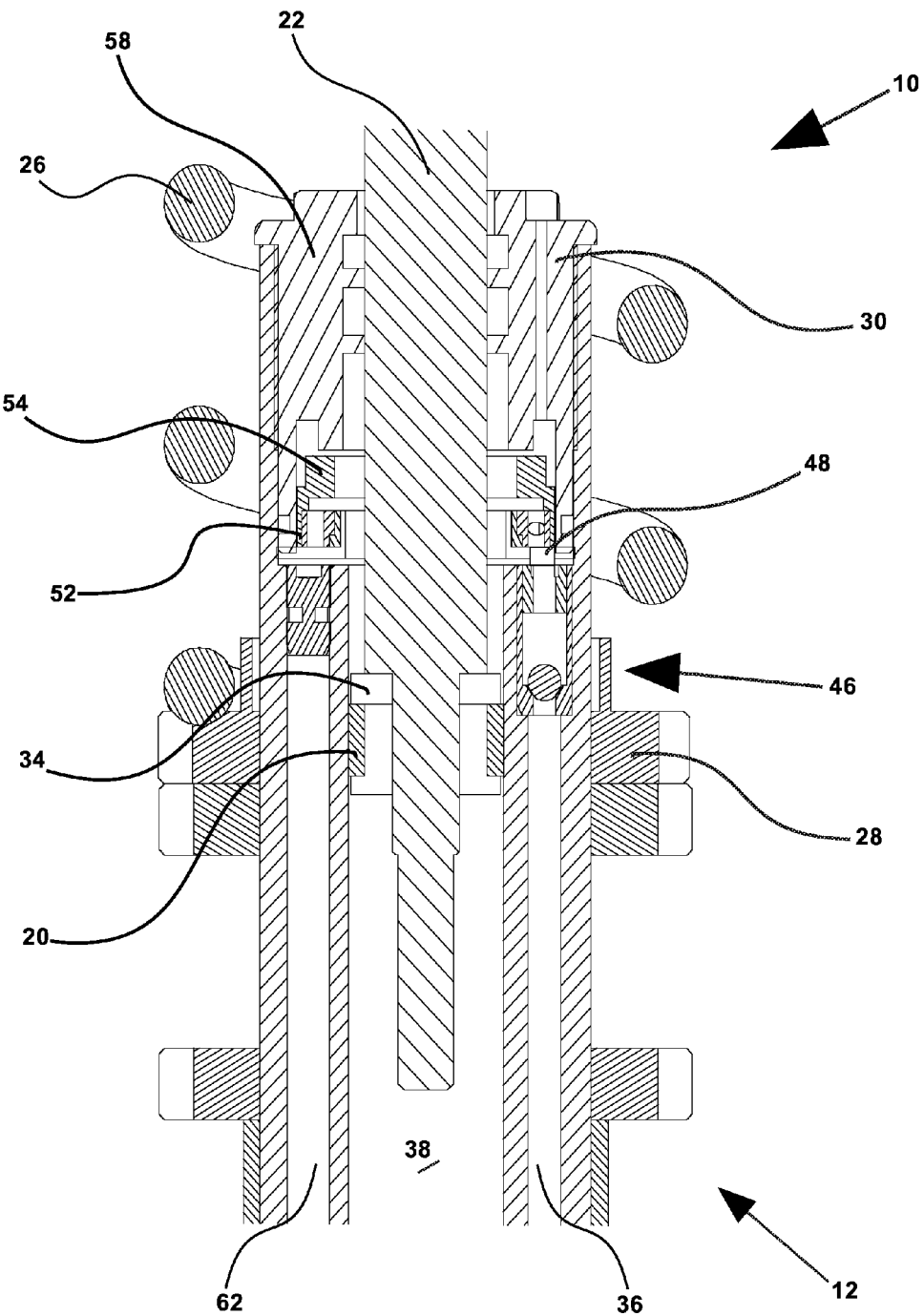
FIG. 1b is a cross sectional view through an upper part of the cylindrical body of FIG. 1a illustrating the electric generator.
Figure 1C:
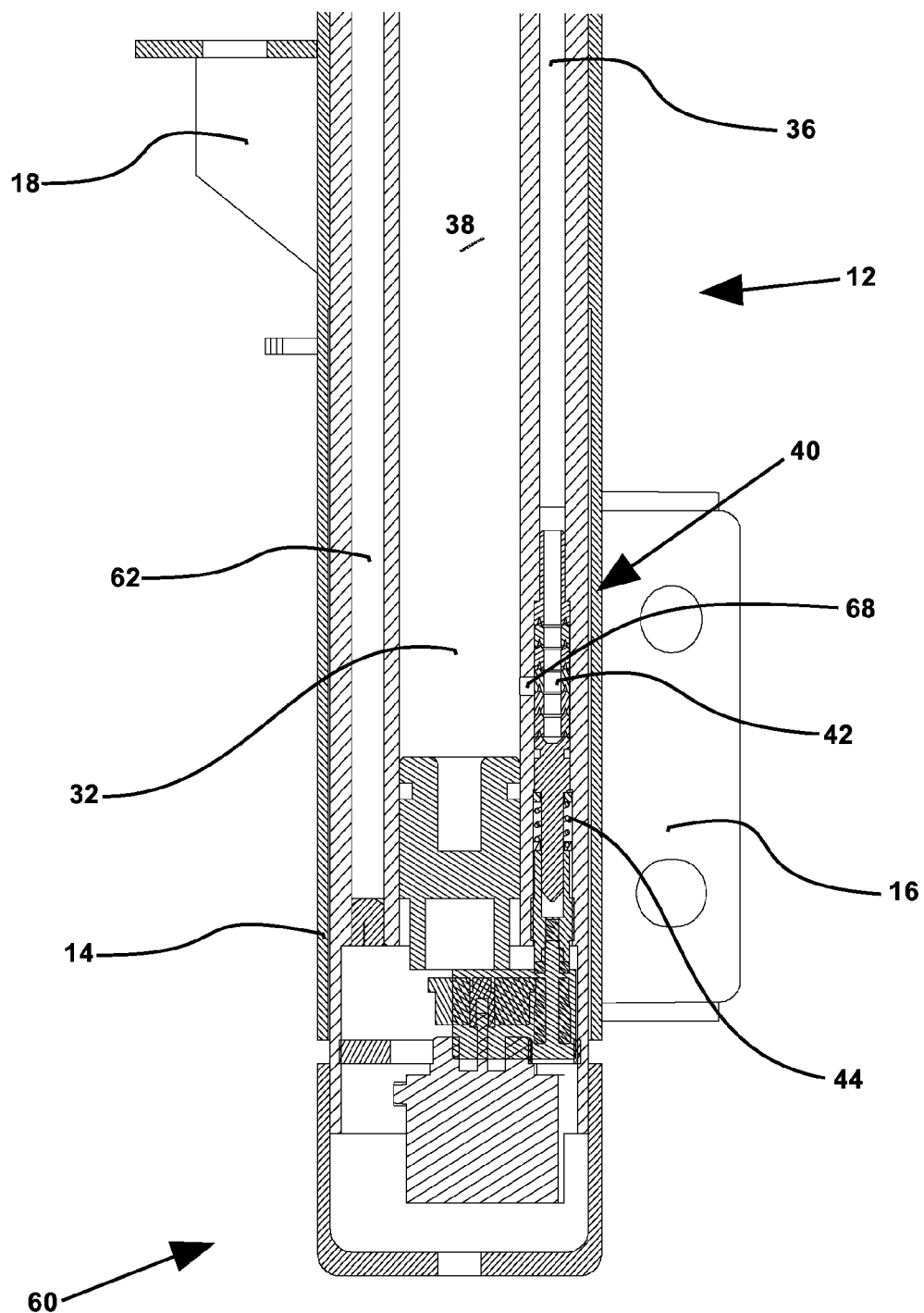
FIG. 1c is a cross sectional view through a lower part of the cylindrical body of FIG. 1a illustrating a compression flow restricting valve.

FIGS. 1a to 1c illustrate one configuration of the shock absorber 12, including a cylindrical body 14, having mounts 16, 18, a piston 20 attached to rod 22 that is slidably positioned with the cylindrical body 14, a upper mount 24 that engages the top of the rod 22, and a spring 26 that extends between mount 24 and an outwardly extending shoulder 28.

As further illustrated in FIGS. 1a to 1c the cylindrical body 14 that defines therein a working chamber that is divided by the piston 20 into a compression chamber 32, being an upper part of the working chamber and a rebound chamber 34, being a lower part of the working chamber.

Figure 2A:
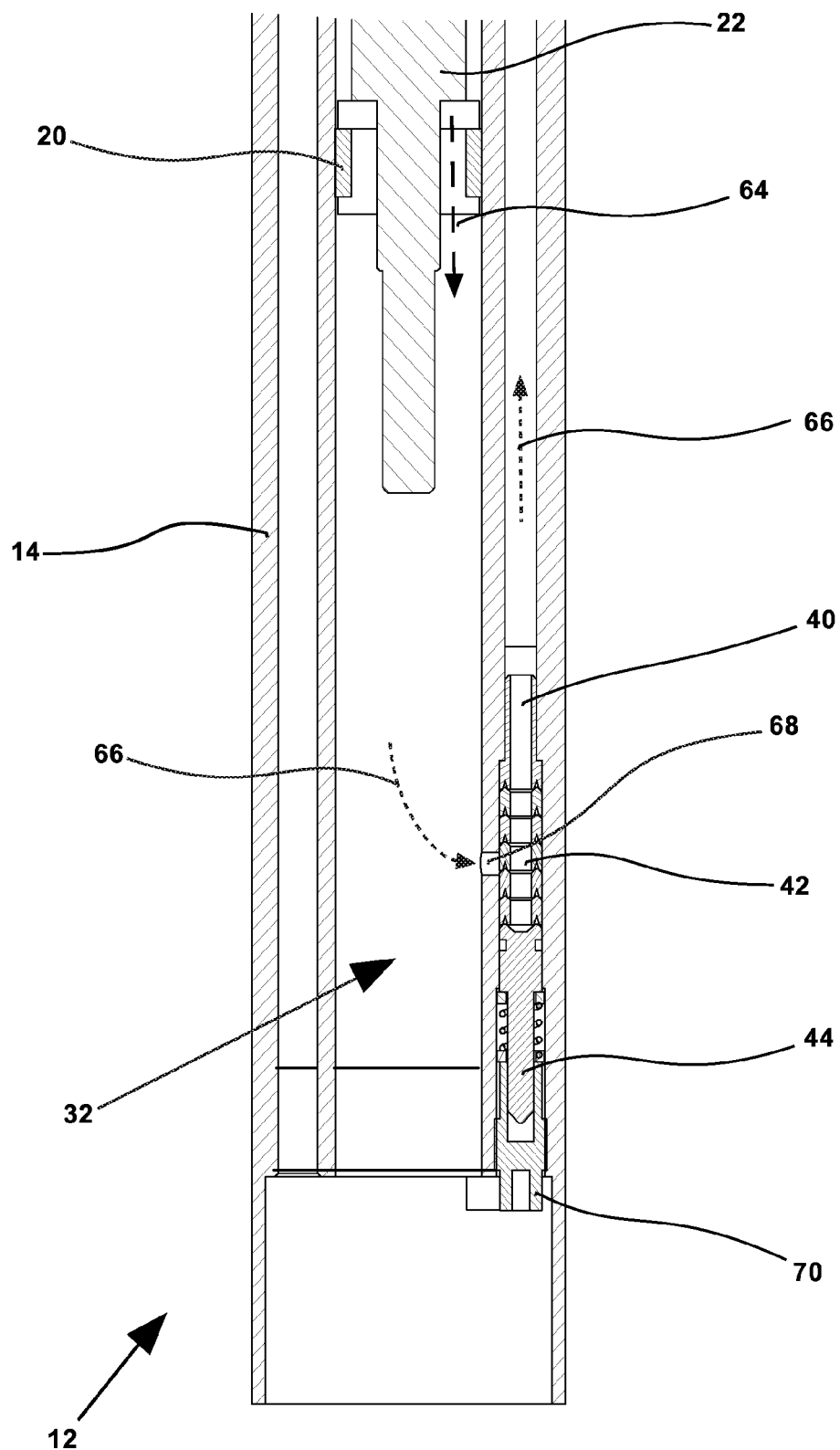
FIG. 2a is a partial cross sectional view of the lower part of the cylindrical body of FIG. 1c showing a flow of damping fluid during a compression stroke.
Figure 2B:
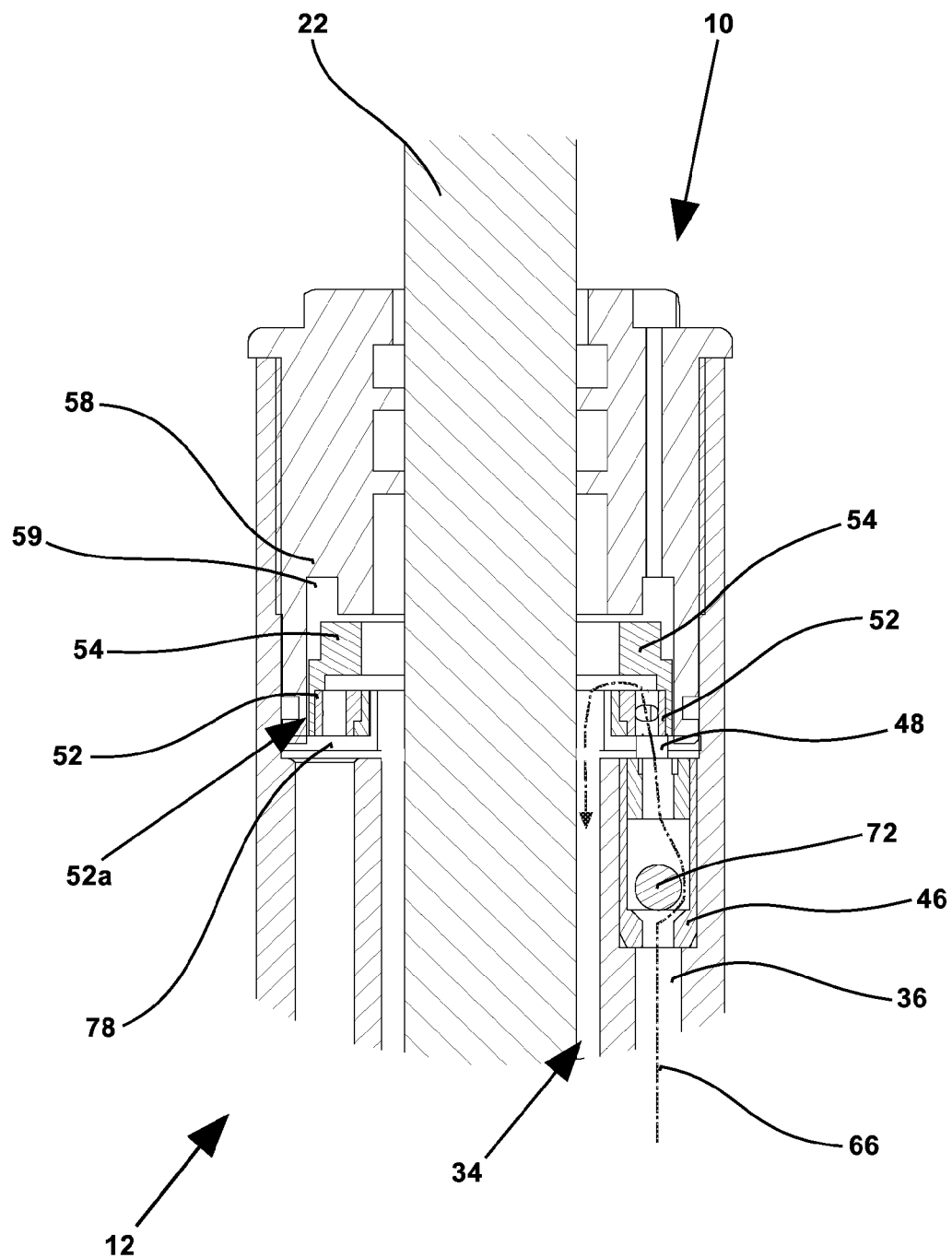
FIG. 2b is a partial cross sectional view of the upper part of the cylindrical body of FIG. 1b showing the electric generator in more detail and the flow of damping fluid during the compression stroke.

As illustrated in FIGS. 2a and 2b a compression flow path comprising a compression flow path passageway 36 extends between the compression chamber 32 and the recoil chamber 34 for movement of damping fluid 38 therethrough during a compression stroke of the piston 20. The compression passageway 36 includes a compression flow restricting valve 40 that comprises a plurality of abutting annular members 42 that are coaxially aligned within the compression passageway 36 and are urged together by a biasing means 44. An increase in the fluid pressure during said compression stroke urges the annular members 42 to separate against the influence of the biasing means 44 to thereby increase a flow of the fluid through the flow restricting valve 40. A compression flow path one-way valve 46 is positioned adjacent compression flow path opening 48 to inhibit the fluid from flowing back through the compression passageway.

Figure 3A:
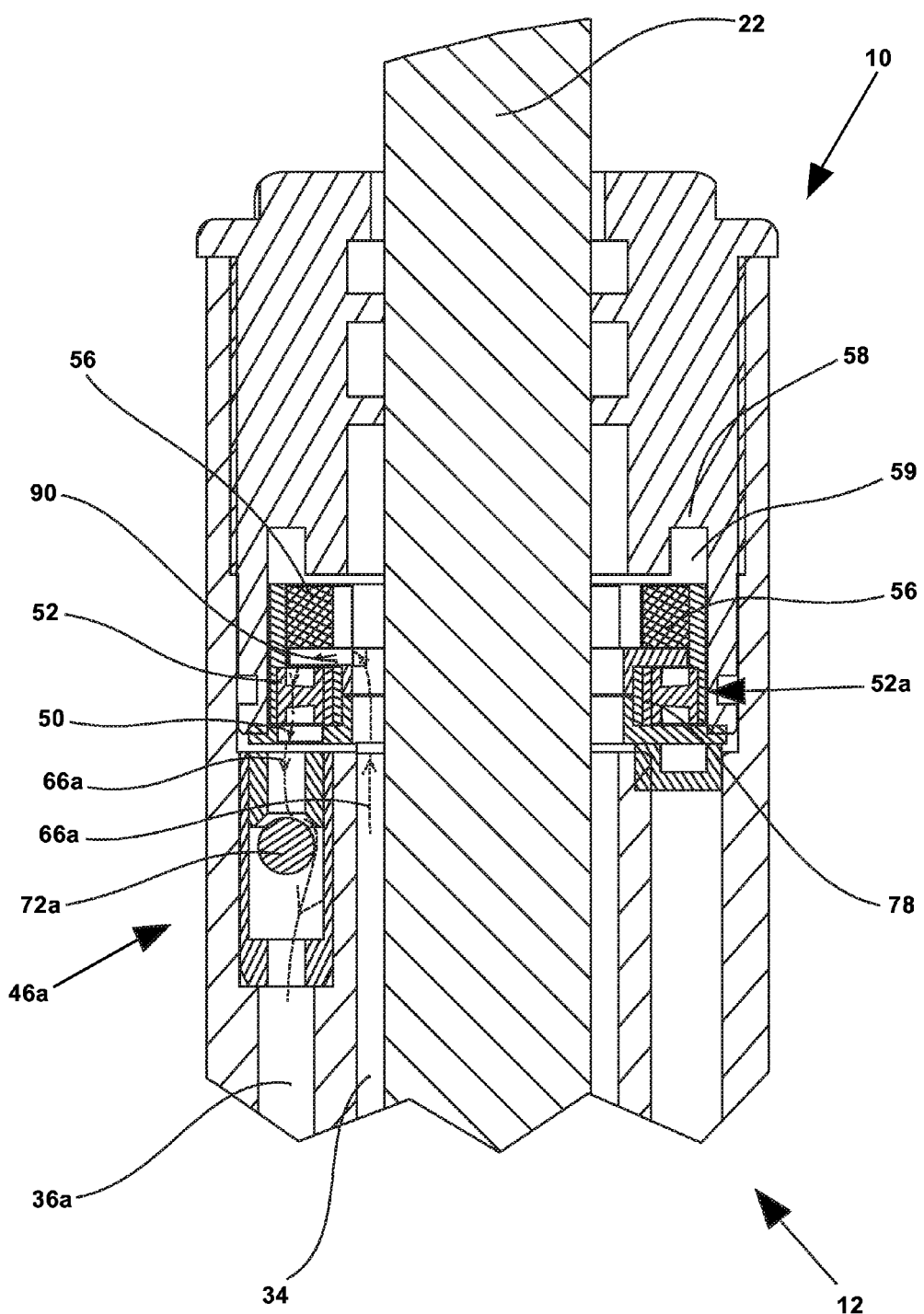
FIG. 3a is a partial cross sectional view of the upper part of the cylindrical body of FIG. 1a showing the electric generator in more detail in more detail and a flow of damping fluid during a rebound stroke.
Figure 3B:
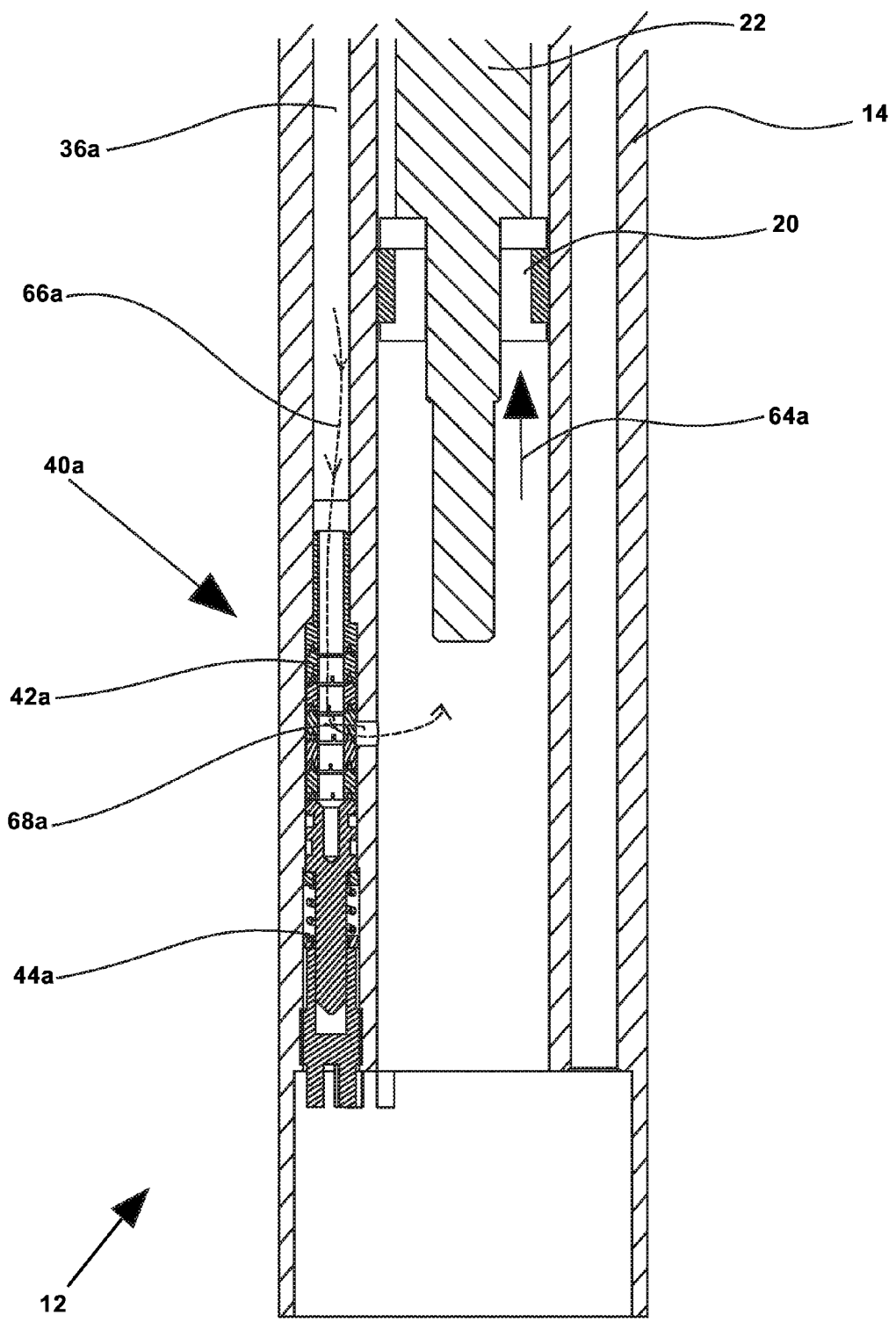
FIG. 3b is a partial cross sectional view of the lower part of the cylindrical body of FIG. 1a illustrating a rebound flow restricting valve and the flow of damping fluid during the rebound stroke.

As illustrated in FIGS. 3a and 3b a rebound flow path comprising a rebound flow path passageway 36a extends between the rebound chamber 34 and the compression chamber 32 for movement of damping fluid 38 therethrough during a rebound stroke of the piston 20. A rebound flow path one-way valve 46a is positioned adjacent rebound flow path opening 50 to inhibit the fluid from flowing back through the rebound passageway. The rebound passageway 36a includes a rebound flow restricting valve 40a that comprises a plurality of abutting annular members 42a that are coaxially aligned within the rebound passageway 36a and are urged together by a biasing means 44a.

The generator 10 includes a turbine 52 supported within a turbine chamber 52a in fluid communication with both the compression and rebound openings 48, 50, wherein movement of the fluid 38 though either of said openings causes the turbine 52 to rotate in single direction. The turbine 52 is fixed to a magnet holder 54 forming a turbine assembly, the magnet holder carrying magnets 56. The turbine 52 and the magnet holder 54 rotate together. A coil housing 58 including at least one, and preferably a plurality of coils (59 indicates to location of the coils) located adjacent to the magnets 56 and stationary relative the magnet holder 54.

Accordingly as the turbine 52 moves in response to the flow of fluid the magnets induce a flow of electrons in the coils 59 of coil housing 58 thereby generating an electric current. The electrical current can then be managed by conventional means and utilised in a variety of ways, perhaps to assist in powering the vehicle, charge batteries or operate accessories during movement of the vehicle.

The generator 10 is screwed into the top of the cylindrical body 14 or the rod guide 30 or forms a part of the rod guide. The shock absorber may further include a gas chamber 60 and sealed void 62. A through shaft arrangement or gas bladder may be used instead of the gas chamber.

During a compression cycle the piston 20 moves in the direction of arrows 64, which causes the fluid 38 to move in the direction of arrow 66, as illustrated in FIGS. 2a and 2b. The fluid 38 is forced through inlet 68 from chamber 32 and then through cavities between the stacked annular members 42. As the pressure within chamber 32 increases the fluid 38 exerts greater pressure on the stacked annular members 42 against the compressive forces of the biasing member 44, to a point that the members 42 are caused to move apart. This thereby increases the cross sectional dimensions with a resultant increase in flow volume of the damper fluid. The configuration of the flow restricting valves has a dampening affect on the shock absorber 12. The compressive force of the biasing member 44 can be adjusted by way of adjustment member 70.

The fluid 38 continues to flow through compression passageway 36 and through the compression flow path one-way valve 46 by moving bead 72 upwardly out of the way. The damping fluid then moves out through the compression flow path opening 48, through the turbine chamber 52a, and down into rebound chamber 34.

In the rebound cycle, as illustrated in FIGS. 3a and 3b, the piston 20 moves in the direction of arrow 64a, which causes the fluid 38 to move in the direction of arrow 66a, as illustrated in FIGS. 3 and 3a. The fluid 38 is urged through base inlet 90 from rebound chamber 34 into the turbine chamber 52a, where the rebound flow path drives the turbine 52. The damping fluid then exits the turbine chamber through rebound flow path opening 50 and passes through rebound flow path one way valve 46 by moving bead 72a downwardly out of the way. The damping fluid then passes through the rebound flow path passageway 36a, then through cavities between the stacked annular members 42, and into the compression chamber 32 via outlet 68a.

The configuration of the vanes formed within ducts 74 that extend through the turbine 52 ensure that the turbine only turns in a single direction, both when the damping fluid 38 is directed onto the turbine during the compression stroke of the piston 20 and during the rebound stroke. The action of the damping fluid on the turbine will described in more detail below. The rotation of the turbine in a single direction simplifies the configuration of the generator 10 because it is not required to handle the bidirectional flow of electrons in the coils, and additionally provides for greater energy efficiency in that the direction of rotation of the turbine is not continually reversed.

Figure 4:
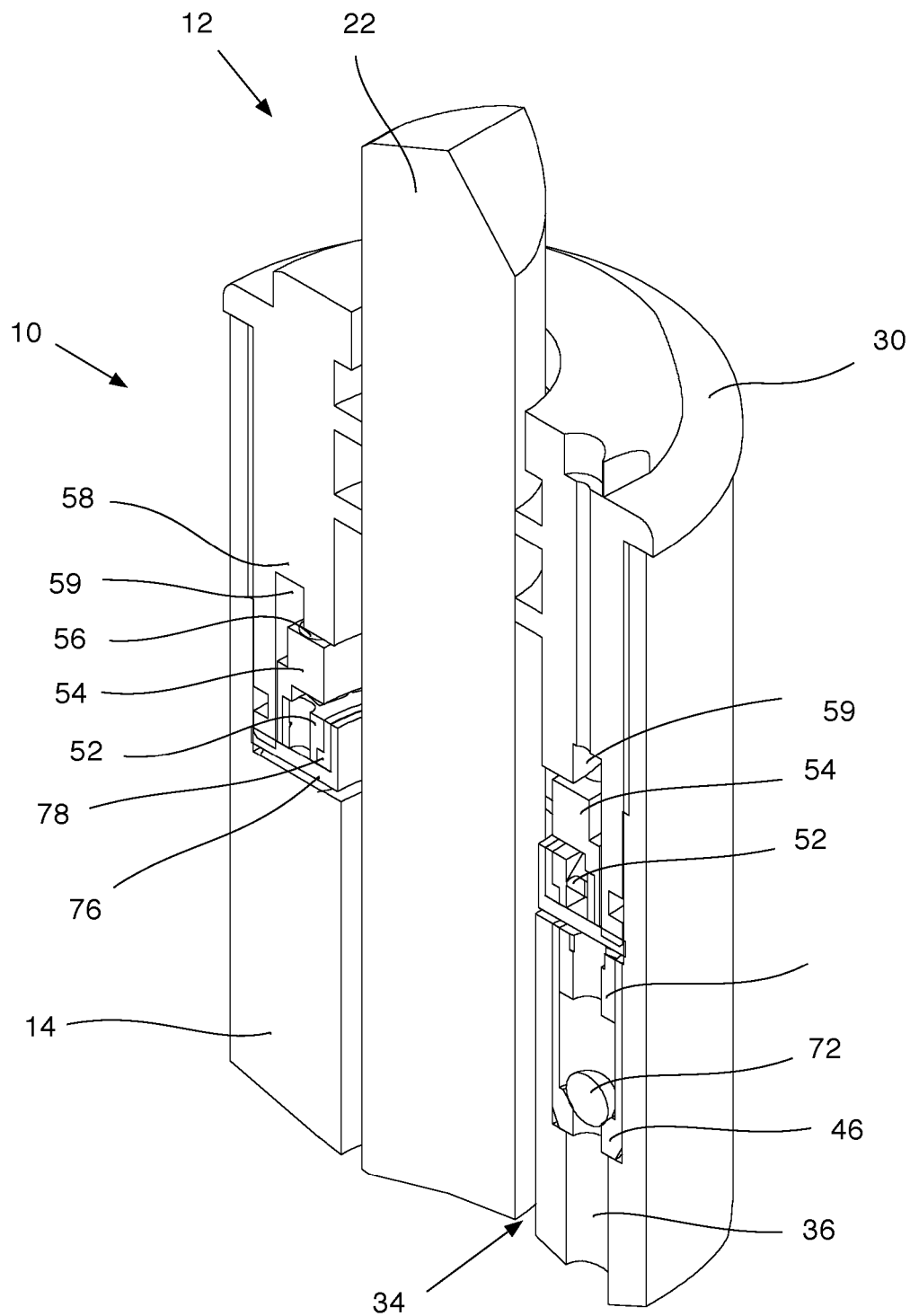
FIG. 4 is a partial perspective view of a cross-section of the electric generator and shock absorber of FIG. 2.
Figure 5:
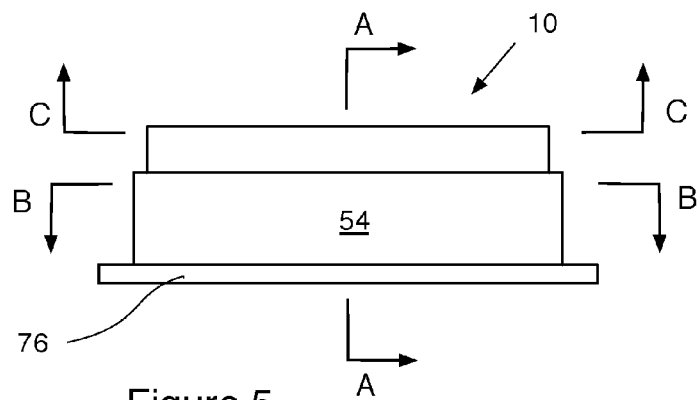
FIG. 5 is a side view of the magnet holder, turbine, bearing and base assembly of the electric generator.
Figure 6:
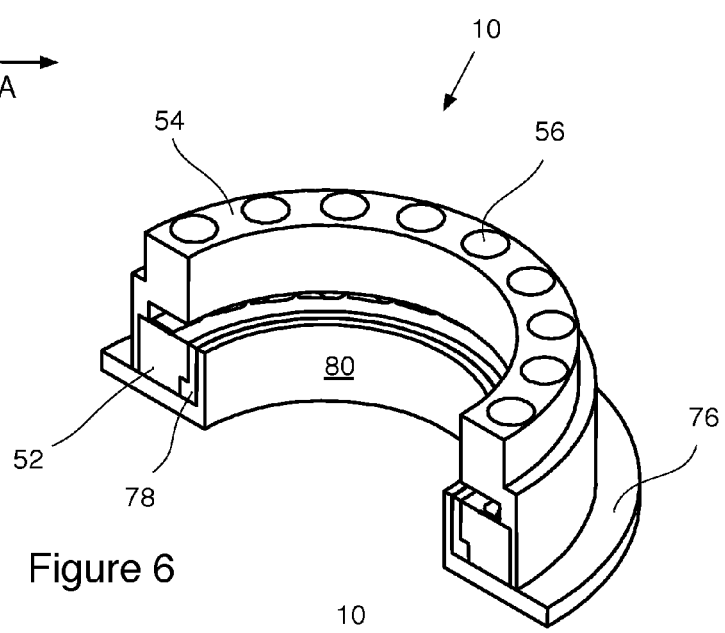
FIG. 6 is a perspective view through A-A of FIG. 5.
Figure 7:
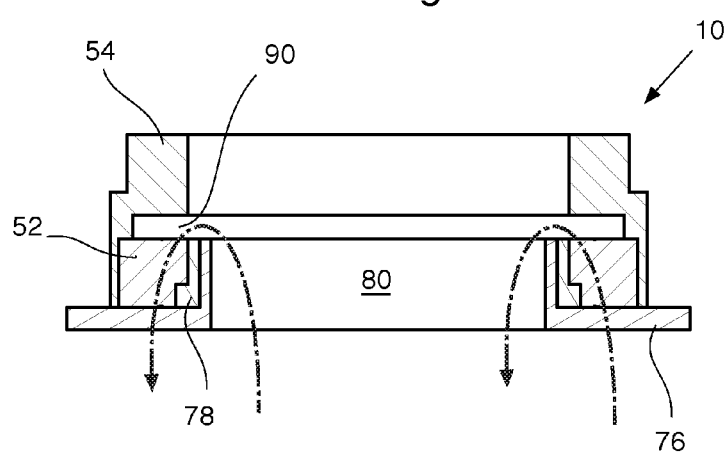
FIG. 7 is a side view through A-A of FIG. 5.

FIGS. 4 to 12 illustrate an embodiment of the turbine assembly of the generator 10 and one possible configuration of the ducts 74 that extend through the turbine 52. As illustrated in FIGS. 4 to 6 the turbine 52 and magnet holder 54 affixed thereto, are rotatably mounted on base 76 that is turn is attached to the shock absorber 12. A turbine bearing sleeve 78 is positioned between the turbine 52 and base 76 as can be seen in FIGS. 5 and 6. The assembly illustrated is configured to slide down over the piston rod 22, wherein the inner surface 80 of the base 76 is spaced apart from the piston rod to permit the flow of the damping fluid 38 to the rebound chamber 34 as shown in FIG. 2.

Figure 8:
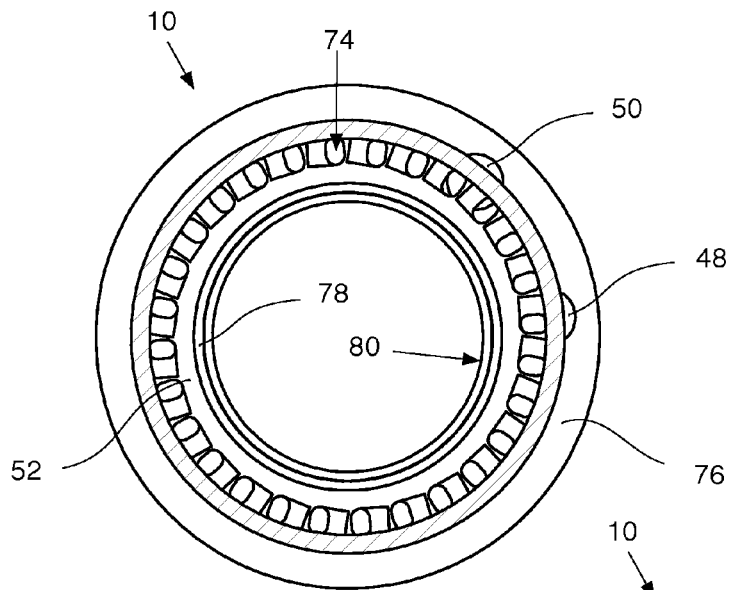
FIG. 8 is a view through B-B of FIG. 5.
Figure 9:
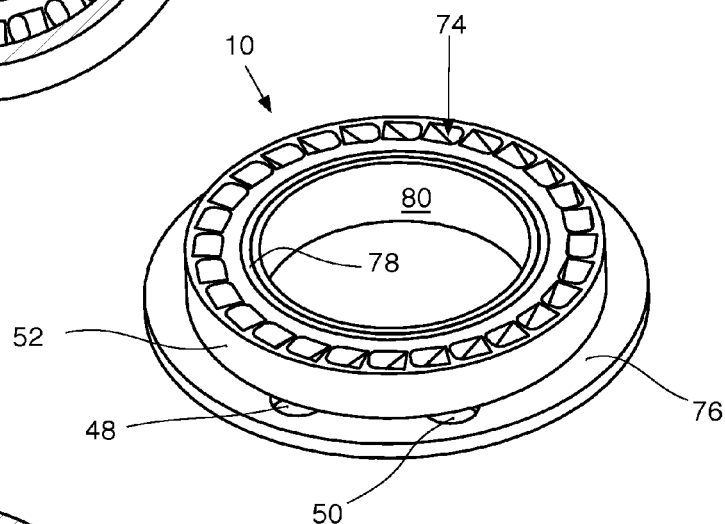
FIG. 9 is a perspective view of the turbine of FIG. 5 mounted on the annular base.
Figure 10:
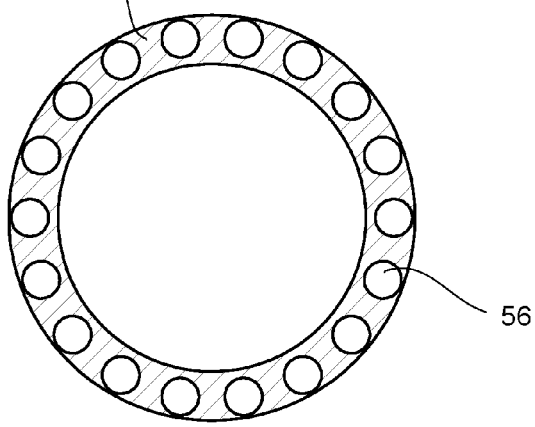
FIG. 10 is a view through C-C of FIG. 5.

The base 76 includes the compression and rebound openings 48, 50, as illustrates in FIGS. 8 and 9. The magnet holder 54 may include eighteen magnets 56, as illustrated in FIG. 9, however the reader should appreciate that the number location, and size of the magnets can be changed without departing from the scope of the invention. In another embodiment six magnets and six corresponding coils could be used.

Figure 11:
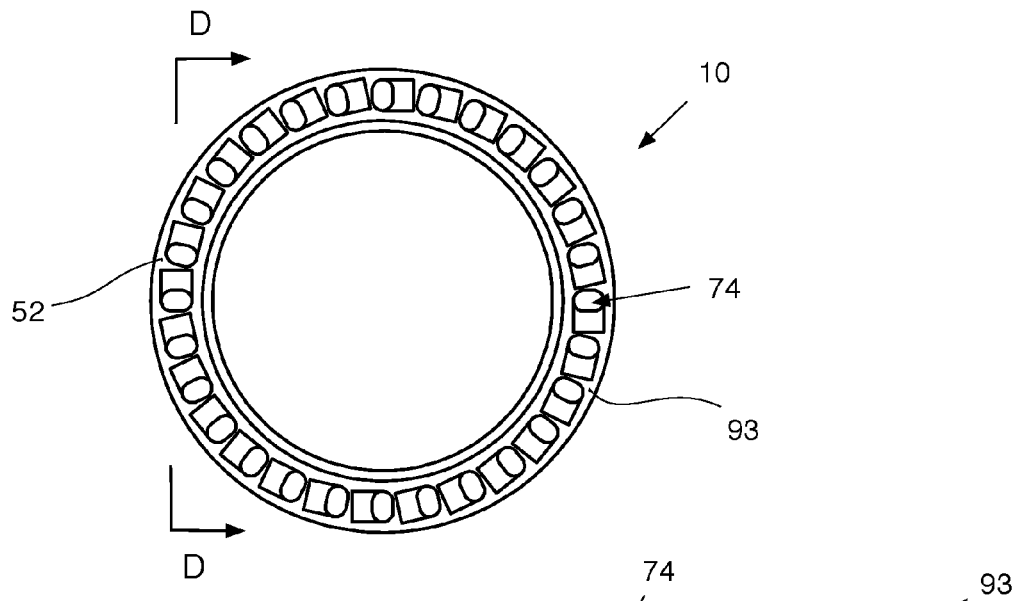
FIG. 11 is an underside view of the turbine of FIG. 5.
Figure 12:
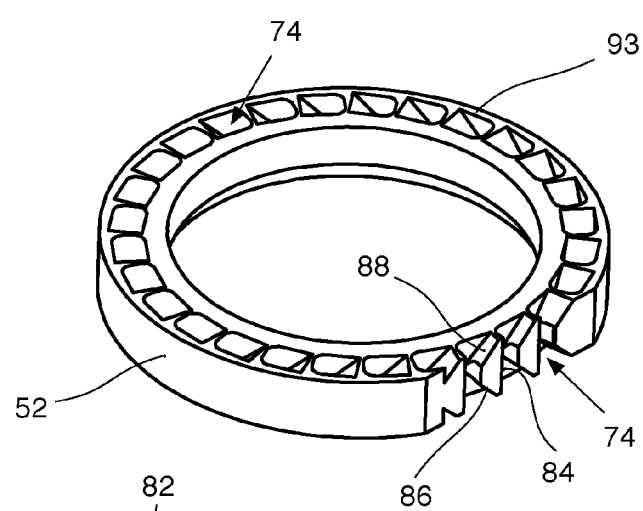
FIG. 12 is a perspective view of the turbine of FIG. 11 through D-D.
Figure 13:
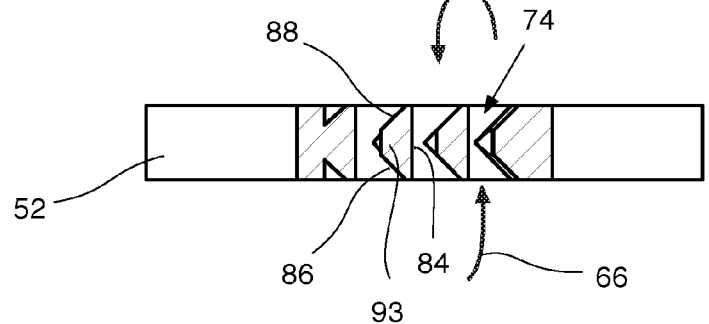
FIG. 13 is a side view of the turbine of FIG. 11 through D-D.
Figure 14:
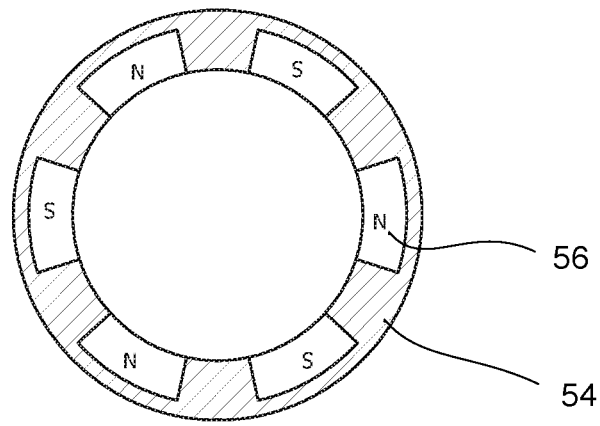
FIG. 14 is a top view of a second illustrated embodiment of a magnet holder showing the layout of embedded magnets.
Figure 15:
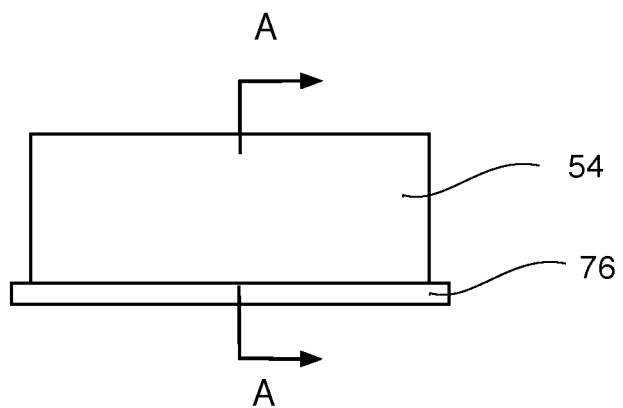
FIG. 15 is a side view of the second embodiment of the magnet holder, turbine, bearing and base assembly of the electric generator.
Figure 16:
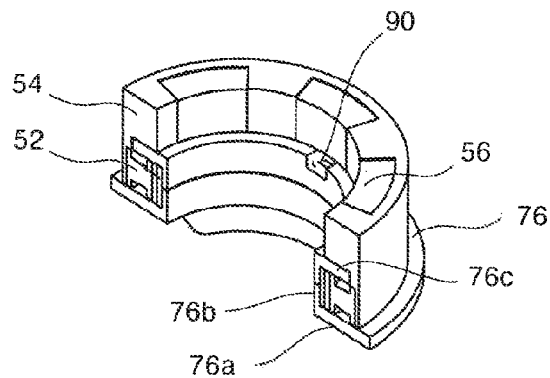
FIG. 16 is a perspective view through A-A of FIG. 15.
Figure 17:
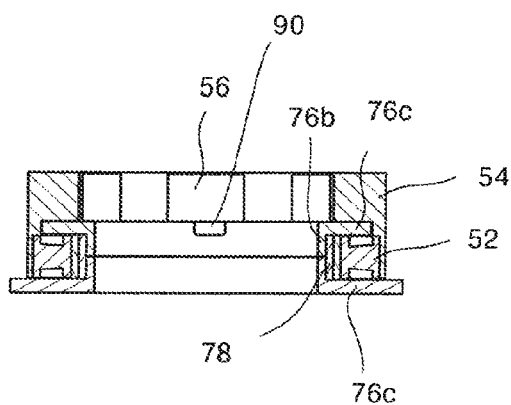
FIG. 17 is a side view through A-A of FIG. 15.

Turning to the configuration of the vanes and associated ducts 74, FIGS. 11 to 13 illustrate one embodiment that would induce rotation of the turbine 52 in one direction whether the flow of the fluid 38 is from below in the direction of arrow 66 during the compression cycle, or the flow is from above in the direction of arrow 82 during the rebound cycle.

The turbine 52 has a generally annular shape with a plurality of ducts 74 extending therethrough. Each duct 74 includes wall 84 that is generally planar and parallel with an axis of rotation of the rotor. The opposing side of the duct 74 includes wall portions 86, 88, that slope inwardly towards the centre of the duct. The impact of the flow of damper fluid on either of wall portions 86, 88 causes the turbine 52 to rotate in the same direction.

The vanes 92 comprise the truncated triangular shaped radially extending members, defined between upright wall 84, and sloped wall portions 86, 88. In the presently illustrated embodiment the plurality of vanes are surrounded by a peripheral turbine ring 93. It is to b understood that the peripheral ring is not essential to the working of the turbine which may thus comprise a plurality of radially extending vanes each having a free end. The configuration without a peripheral turbine ring may be preferably for ease of manufacture and perhaps also in that it may provide a greater surface area of the sloped wall portions 86, and 88.

FIG. 14 through FIG. 17 show a second embodiment of the turbine assembly. In this embodiment there are provided six magnets 56 spaced apart around an internal central aperture of the magnet holder 54. The magnets have tapered sides can be slotted into complementary shaped slots in the magnet holder, and set in place by, for example an adhesive. The base 76 comprises a lower portion 76a and upright portion 76b as in the first embodiment and in this embodiment additionally comprises a cover 76c that extends inwardly from the central aperture of the turbine assembly into a internally extending annular gap between the turbine 52 and the magnet holder. The base 76 is shown as being constructed in two parts a lower part and upper part, to assist with manufacture and fitting. The upper part of the base comprises a base opening 90 to allow for ingress and outflow of damping fluid during the compression and rebound strokes of the piston.

Figure 18:
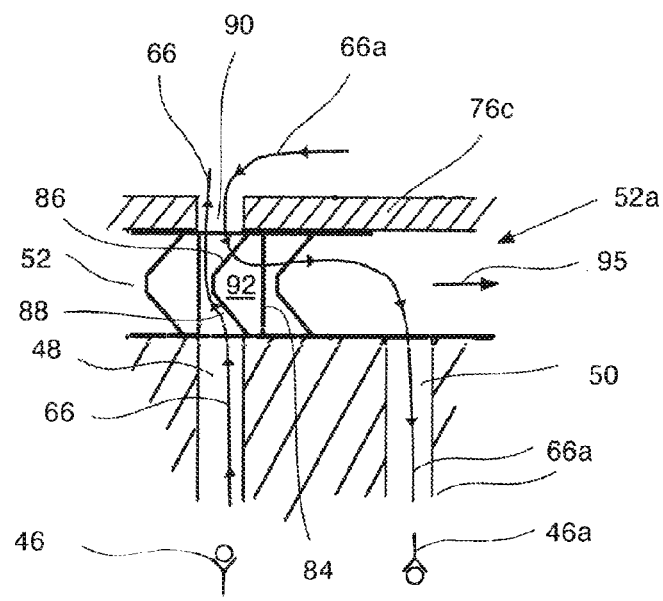
FIG. 18 is cross sectional detail showing part of the turbine within the turbine chamber and direction of flow of damping fluid through the compression flow path and rebound flow path.

FIG. 18 is an somewhat schematic illustration of the manner in which the compression flow and rebound flow of damper fluid impact the turbine 52 and vanes 92 of the turbine.

The compression flow path is indicated by arrow 66. Flow via this flow path on the compression stroke of the piston passes up the compression flow path passageway 36 and then though compression flow path one way valve 46 then through compression opening 48 into the turbine chamber 52a where it urges against face of wall portion 88 of vane 92 to impart rotational force in direction shown by arrow 95. The flow of damper fluid then passes out of the turbine chamber 52a via the base opening 90.

The rebound flow path is indicated by arrow 66a. Flow via this flow path on the rebound stroke of the piston passes into the turbine chamber 52 via base opening 90 impacting on the face of wall portion 86 of vane 92 to impart rotation force in the direction shown by arrow 95. The rebound flow path 66a then traverses the turbine chamber of some way before exiting via rebound opening 50, and then passes through rebound flow path one way valve 46a into the rebound flow path passageway 36a.

It can be seen therefore in this arrangement that the turbine 52 is rotated in the same direction by pressure exerted by both the compression stroke and the rebound stroke of the piston.

The reader will appreciate that other configurations of ducts or vanes could be used without departing from the scope of the invention. Thus the angles of the wall portions may be varied and profiles varied to suit flow control or efficiency of rotation of the turbine. The height of the ducts may also be altered to suit the shock absorber.

Various features of the invention have been particularly shown and described in connection with the exemplified embodiments of the invention, however, it must be understood that these particular arrangements merely illustrate and that the invention is not limited thereto. Accordingly the invention can include various modifications, which fall within the spirit and scope of the invention. It should be further understood that for the purpose of the specification the word "comprise" or "comprising" means "including but not limited to".

The invention claimed is:

1. An electric generator for attachment to a shock absorber having a cylindrical body, the electric generator comprising:

an annular turbine fixed to a magnet holder thereby forming a turbine assembly, said turbine assembly rotatably held within an annular base, at least one magnet connected to the annular turbine for rotation therewith, and at least one coil positioned so as to generate an electric current on rotation of said at least one magnet;

a piston separating the cylindrical body of the shock absorber into a compression chamber and a rebound chamber; the piston being actuated in a compression stroke and a rebound stroke, the piston comprising a piston rod extending upwardly of the piston, the electric generator being fitted over the piston rod so that the annular turbine is routable around the piston rod;

the annular base is configured to slide over the piston rod and be attached to the cylindrical body of the shock absorber, such that the annular base does not inhibit movement of the piston rod;

the annular turbine comprising a plurality of circumferentially arranged vanes;

the base having at least one compression opening and at least one rebound opening each leading into the base from axially opposite directions of the annular turbine, the at least one compression opening being in fluid communication with the at least one rebound opening by way of a respective duct associated with each of the plurality of vanes;

each duct including a first section, a middle section, and a second section, the first section including a planar wall, the second section including a first oblique wall portion and a second oblique wall portion, the first and second oblique wall portions sloping towards the middle section of the duct;

each of the vanes having a truncated triangular shape that is defined by the planar wall and the first and second oblique wall portions of the respective duct, wherein the first oblique wall portion is a compression face for rotation by a damping fluid flowing through the at least one compression opening and the second oblique wall portion is a rebound face for rotation by the damping fluid flowing through the at least one rebound opening;

whereby the annular turbine is caused to rotate in a first direction when the damping fluid is flowing along a rebound flow path through the rebound opening and impacting upon said rebound face and the annular turbine is caused to also rotate in said first direction when the damping fluid is flowing along a compression flow path through the compression opening and impacting upon the compression face.

2. The electric generator of claim 1, wherein the planar wall of each duct is perpendicular to a first upper surface or a second underside surface of the annular turbine.

3. The electric generator as in claim 1, wherein the compression flow path includes a flow restricting valve.

4. The electric generator as in claim 3, wherein the flow restricting valve comprises a plurality of abutting annular members coaxially aligned within the compression flow path and urged together by a biasing device, whereby during an increase in fluid pressure the annular members separate against the urging of said biasing device to increase the flow of damping fluid and thereby cause said fluid pressure to drop below a predetermined pressure level.

5. The electric generator as in claim 1, wherein the compression flow path provides for flow of the damping fluid from the compression chamber through a turbine chamber and to the rebound chamber;
- a first one way valve being positioned within the compression flow path to allow for the flow therethrough only on the compression stroke; and
- a second one way valve being positioned within the rebound flow path to allow for the flow therethrough only on a rebound stroke.

\* \* \* \* \*